United States Patent
Osiniak et al.

(10) Patent No.: US 11,422,056 B2
(45) Date of Patent: Aug. 23, 2022

(54) METHOD FOR MEASURING THE UTILIZATION OF THE LOAD CARRYING CAPACITY OF THE BUILDING STRUCTURAL ELEMENT

(71) Applicant: WiSeNe Sp. Z o.o., Warsaw (PL)

(72) Inventors: Marcin Osiniak, Warsaw (PL); Edward Antoszkiewicz, Julianow (PL); Zbigniew Pioro, Julianow (PL); Stanislaw Wierzbicki, Warsaw (PL)

(73) Assignee: WiSeNe Sp. Z o.o.

(*) Notice: Subject to any disclaimer, the term of this patent is extended or adjusted under 35 U.S.C. 154(b) by 0 days.

(21) Appl. No.: 17/220,810

(22) Filed: Apr. 1, 2021

(65) Prior Publication Data
US 2021/0310896 A1  Oct. 7, 2021

(30) Foreign Application Priority Data
Apr. 4, 2020 (PL) .......................................... 433466

(51) Int. Cl.
*G01M 5/00* (2006.01)
*E04B 7/02* (2006.01)

(52) U.S. Cl.
CPC ............. *G01M 5/0041* (2013.01); *E04B 7/02* (2013.01)

(58) Field of Classification Search
CPC ................................. G01M 5/0041; E04B 7/02
See application file for complete search history.

(56) References Cited

U.S. PATENT DOCUMENTS

| 8,788,240 B2 * | 7/2014 | Pioro | G01B 11/16 702/150 |
| 2008/0030710 A1 * | 2/2008 | Oshima | G01C 3/02 359/850 |

(Continued)

FOREIGN PATENT DOCUMENTS

| CN | 206670571 | * 11/2017 | |
| EP | 3312555 A1 * | 4/2018 | G01B 11/26 |

(Continued)

OTHER PUBLICATIONS

Polish search report for application No. P.433466, dated Apr. 8, 2021, 1 page.

(Continued)

*Primary Examiner* — Stephanie E Bloss
(74) *Attorney, Agent, or Firm* — Ware, Fressola, Maguire & Barber LLP

(57) ABSTRACT

A method is shown for measuring the utilization of the load carrying capacity of a building structural element subject to variable action, including measurements of the rotation angles of cross-sections of this building structural element, wherein the rotation is caused by the variable action, wherein the rotation angles $\alpha 1$ and $\alpha 2$ of the cross-sections of the building structural element around the axis (Z) perpendicular to the longitudinal section of this building structural element are measured in two points (A) and (B) of this building structural element, located symmetrically relative to its transverse axis of symmetry, and subsequently the greater of the measured values of the angles $\alpha 1$ and $\alpha 2$ is used as the measure of the utilization of the load carrying capacity of the building structural element.

4 Claims, 2 Drawing Sheets

(56) References Cited

U.S. PATENT DOCUMENTS

| | | | | |
|---|---|---|---|---|
| 2011/0029276 A1* | 2/2011 | Cabral Martin | .... | G01M 5/0041 |
| | | | | 702/141 |
| 2012/0166136 A1* | 6/2012 | Pioro | ...................... | G01B 11/16 |
| | | | | 702/150 |
| 2017/0307467 A1* | 10/2017 | McCallen | ................ | G01M 7/02 |
| 2018/0164093 A1* | 6/2018 | Westcott | ............. | G01M 5/0008 |
| 2019/0390955 A1* | 12/2019 | Pioro | ........................ | G01C 5/00 |

FOREIGN PATENT DOCUMENTS

| | | |
|---|---|---|
| EP | 3312555 A1 | 4/2018 |
| FI | 118701 B | 2/2008 |
| PL | 183116 B1 | 5/1997 |
| PL | 381578 A1 | 4/2008 |

OTHER PUBLICATIONS

Machine translation of the abstract for PL379088A1, 1 page.
Bibliographic data by DEPATISnet for PL379088A1, 1 page.

\* cited by examiner

METHOD FOR MEASURING THE UTILIZATION OF THE LOAD CARRYING CAPACITY OF THE BUILDING STRUCTURAL ELEMENT

BACKGROUND

The object of this invention is a method for measuring the utilization of the load carrying capacity of the building structural element subjected to variable actions, for example loaded with snow. The method can be used in systems for monitoring the utilization of the load carrying capacity (the level of safety risk) of roof structures of buildings, especially large-area buildings.

Monitoring the structure of buildings, in particular roof structural elements, leads to improvement of the safety of using these buildings. The basic group of methods used for this purpose includes methods for monitoring changes in the position of structural elements of a building using optical devices.

The specification of the Polish application P.381578 presents a method for detecting the achievement of predetermined utilization of the load carrying capacity based on directing a light beam below the beams of a roof structure. By excessive bending of at least one beam beyond a permitted, assumed value, the light beam is interrupted and then audible and visual alarms are activated.

The Polish patent description PL183116 discloses a method for measuring the twisting and deflection of a beam in static and dynamic systems, wherein at least one mirror is attached to the test element to which a laser beam is directed, which, after reflection, is read in a screen.

The applicants of the subject invention have developed a method for monitoring the vertical displacement component and vertical deflection component of structural elements of buildings using measurements made by laser rangefinders, disclosed in the U.S. Pat. No. 8,788,240 B2. The distance measurements performed in this method are made in relation to fixed elements, such as the floor.

The description of the patent FI118701B discloses a method for monitoring the load of the roof structure using inclinometers, i.e. instruments measuring the inclination of the measurement axis of the inclinometer from a plane perpendicular to the direction of the gravity vector, wherein they are placed on the structural elements of buildings freely, e.g. on one side of the structure of a roof or a building. The disadvantage of such a system is the possibility of the occurrence of large errors when measuring the utilization of the load carrying capacity of the structure in the case of an asymmetrical load on the roof.

The applicants of the present invention have developed a method for monitoring the variable actions on the roof structure with the use of inclinometers, which has been disclosed in the Polish patent description PL230522. This patent uses the measurements of rotation angles of cross-sections, caused by the variable action, by means of two inclinometers mounted on the monitored structural element in two points, symmetrically relative to its transverse axis of symmetry. Subsequently, the sum of absolute values of these angles is used as the measure of its load carrying capacity utilization. This sum represents well the utilization of the load carrying capacity in the case of some building structural elements, e.g. in the case of a single-span frame-based structure, in a situation when the maximum value of the utilization of the load carrying capacity occurs in the corner of the frame, where the value of the bending moment is usually the highest. In other cases, the error of determining the utilization of the load carrying capacity by means of said sum can be unacceptably high.

Known methods for monitoring the deflection of structural elements using laser rangefinders have limited applicability in cases when the ambient temperature is too low or too high, when the ground is uneven and soiled, or when there is high dustiness, which occurs, e.g. in the wood industry.

Known methods for monitoring the variable action on the roof structure using inclinometers are characterised by large measurement errors for a non-uniformly distributed load.

SUMMARY

The object of the invention is a method for measuring the utilization of the load carrying capacity of the building structural element, used to reliably determine the level of risk to the safety of use of a building caused by temporary external factors, e.g. atmospheric. This method should be insensitive to the asymmetry of the load of the building structural element and harsh environmental conditions, such as very low temperatures (lower than −20° C.), frost, very high temperatures (higher than +50° C.), high humidity, high dustiness, contamination of the ground (e.g. snow or mud in open canopies), etc.

The object of the invention is a method for measuring the utilization of the load carrying capacity of a building structural element subject to variable action, comprising measurements of the rotation angles of cross-sections of this building structural element, wherein the rotation is caused by this variable action, characterised in that the rotation angles $\alpha 1$ and $\alpha 2$ of the cross-sections of the building structural element around the axis Z perpendicular to the longitudinal section of this building structural element are measured in two points A and B of this element, located symmetrically relative to its transverse axis of symmetry, and subsequently the higher of the measured values of the angles $\alpha 1$ and $\alpha 2$ is used as the measure of the utilization of the load carrying capacity of said element.

Also, it is preferable when the values of rotation angles $\gamma 1$ and $\gamma 2$ of cross-sections of the building structural element around axes perpendicular to these sections are also measured in points A and B of the building structural element, and subsequently the values of angles $\gamma 1$ and $\gamma 2$ are used as an indicator of a stability loss of the given building structural element.

Also, it is preferable when the measurements of the angles are performed periodically and/or synchronously.

The measurement of rotation angles is performed by means of inclinometers or other known devices or methods, such as geodetic methods.

The utilization of the load carrying capacity of a building structural element subject to variable action, determined based on the measured values of rotation angles $\alpha 1$ and $\alpha 2$ of the cross-sections around the axis Z, or its loss of stability, determined based on the measured values of rotation angles $\gamma 1$ and $\gamma 2$ of its cross-sections around an axis perpendicular to these sections, means exceeding the limit states of the utilization of the load carrying capacity, meaning that the structure has reached a state threatening the safety of the building and its users. Here, stability of the structure is understood as the ability of the structure to retain its unchanged position and shape under the load.

It is a common assumption that the deflection of a structural element is a good measure of the utilization of the load carrying capacity of this element, wherein said deflection is preferably measured in the middle of its span. In a case when the load is distributed uniformly across the entire span of the element, the deflection measured in the middle of its span is a good measure of the utilization of the load carrying capacity. In the case of an asymmetrical load, deflection measured in the middle of its span can be a considerably worse representation of the utilization of the load carrying capacity of this element. Similar or much larger errors in determining the utilization of the load carrying capacity of the element can result from using a single measurement of the rotation angle of the cross-section at one of the ends of this element.

The proposed method is free of the above mentioned disadvantages, and both in the case of symmetrical and asymmetrical loads it represents the utilization of the load carrying capacity of the building structural element with sufficient accuracy.

BRIEF DESCRIPTION OF THE DRAWINGS

The method according to the invention is presented carried out in an embodiment in FIG. 1, which presents the load diagram of a single-span, frame-based building structural element and the measurement scheme of rotation angles, wherein Incl_1 and Incl_2 are inclinometers measuring the rotation angles $\alpha 1$ and $\alpha 2$ caused by the variable action and shown by the arrows 7 and 8, of the frame cross-sections around the axis Z perpendicular to its cross-section, in two points A and B of the frame, positioned symmetrically relative to its transverse axis of symmetry 6. In a preferable embodiment, the inclinometers Incl_1 and Incl_2 also measure the values of rotation angles $\gamma 1$ and $\gamma 2$ of the cross-sections of the frame around an axis perpendicular to these sections.

DETAILED DESCRIPTION

Figure 1:
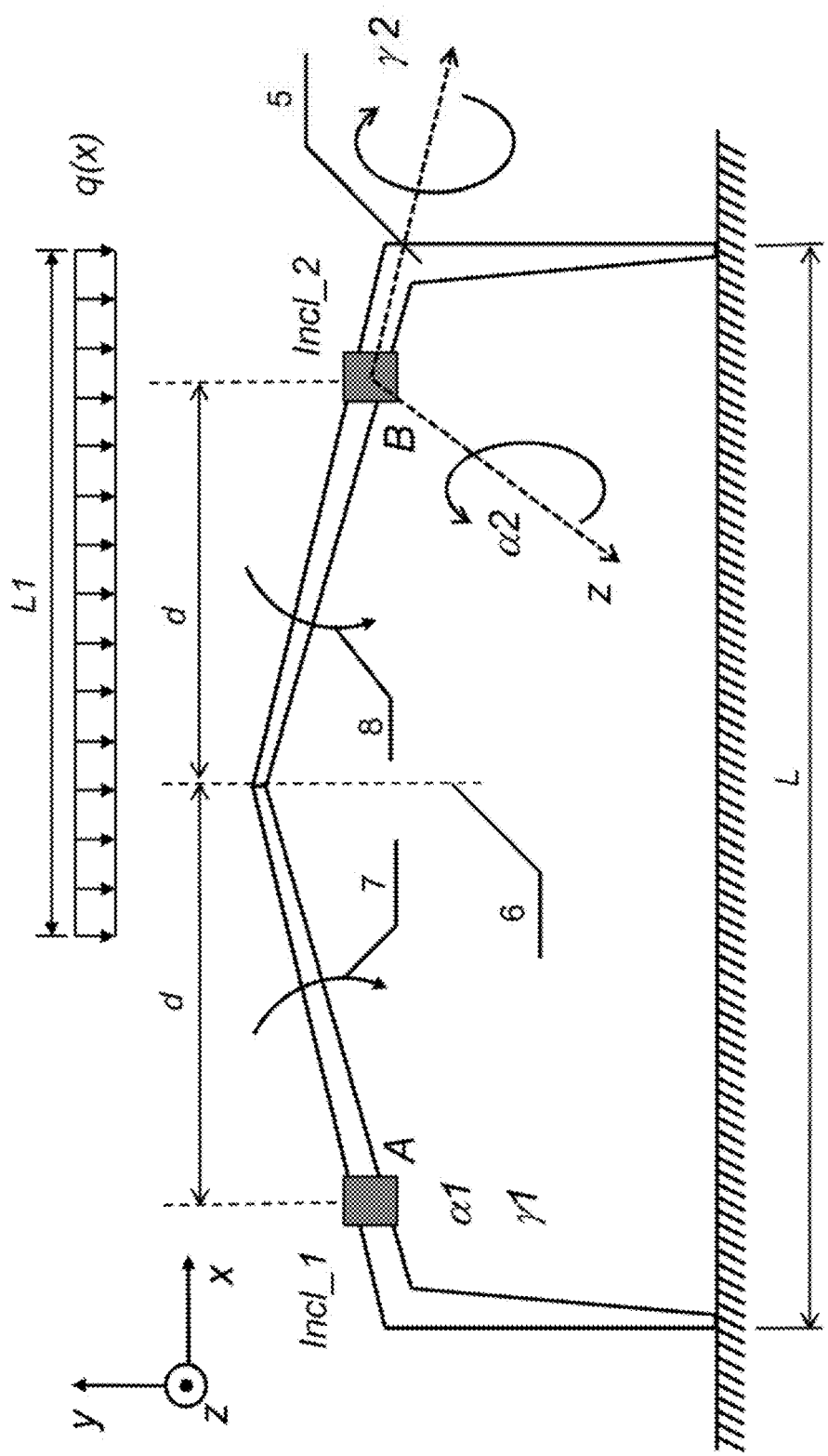

FIG. 1 presents schematically a sample building structural element in the form of a single-span frame. It will be evident to the skilled person that it is possible to use the method according to the invention to measure the utilization of the load carrying capacity of other types of structural elements, e.g. a beam, a truss, an arch or a part of an arch seated on vertical pillars or resting directly on the foundations.

As indicated above, FIG. 1 shows an example of symmetric attachment of two inclinometers Incl_1 and Incl_2 on a frame-based building structural element at the same distance d from the transverse axis of symmetry 6 of this structural element. The upper part of the drawing shows with arrows the variable load q(x) of the roof, e.g. due to snow, occurring over a part of the span with the length L1. The arrows 7 and 8 pointing downwards show the directions of rotation of the cross-sections of the structural element under a variable load in the region of attachment of the inclinometers Incl_1 and Incl_2. In the two indicated points A and B, the rotations have opposite directions. It is assumed that the values of rotation angles following the arrows 7 and 8 are greater than zero.

The points of attachment of the inclinometers Incl_1 and Incl_2 depend on the type of the structure, the type of the structural element and its span, indicated in FIG. 1 by the letter L (the spacing of piles). It is preferable that the inclinometers be fixed in points where the absolute values of the rotation angles $\alpha 1$ and $\alpha 2$ of the cross-sections caused by the variable action are as large as possible, preferably close to the maximum values.

Table 1 lists the results of simulation calculations for the framework structure system with sample defined parameters presented in FIG. 1, for the load q(x) changing from uniformly distributed across the entire length of the roof (L1=L, case 1 in Table 1) to located in ⅕ of the span (L1=0.2 L, case 9 in Table 1).

TABLE 1

Deflection values u in the middle of the span, the rotation angles $\alpha 1$, $\alpha 2$, the maximum stress $\sigma_{max}$ occurring in the element, the greater of the rotation angles $\alpha_{max}$ and errors of measuring the utilization of the load carrying capacity for: deflection - $\delta 1$, the smaller of the rotation angles - $\delta 2$, the greater of the rotation angles - $\delta 3$, and the average value of the rotation angles - $\delta 4$, for the frame shown in FIG. 1 (L = 29.5 m and d = 11.25 m), for various load patterns - from one uniformly distributed across the entire length of the roof (L1 = L) to one located only in 1/5 of the span (L1 = 0.2 L).

| No. | L1/L | u [mm] | $\alpha 1$ [°] | $\alpha 2$ [°] | $\sigma_{max}$ [MPa] | $\alpha_{max}$ [°] | $a_{av}$ [°] | $\delta 1$* [%] | $\delta 2$** [%] | $\delta 3$*** [%] | $\delta 4$**** [%] |
|---|---|---|---|---|---|---|---|---|---|---|---|
| a | b | c | d | e | f | g | h | i | j | k | l |
| 1 | 1.0 | 60.0 = $u_0$ | 0.277 = $\alpha 1_0$ | 0.277 | 113.33 = $\sigma_{max0}$ | 0.277 = $\alpha_{max0}$ | 0.227 = $\alpha_{av0}$ | 0 | 0 | 0 | 0 |
| 2 | 0.9 | 59.4 | 0.262 | 0.282 | 110.40 | 0.282 | 0.272 | 2 | −3 | 4 | 1 |
| 3 | 0.8 | 56.8 | 0.213 | 0.293 | 113.82 | 0.293 | 0.253 | −6 | −31 | 5 | −10 |
| 4 | 0.7 | 50.9 | 0.145 | 0.297 | 112.90 | 0.297 | 0.221 | −17 | −90 | 7 | −25 |
| 5 | 0.6 | 41.6 | 0.078 | 0.285 | 101.51 | 0.285 | 0.182 | −29 | −218 | 13 | −37 |
| 6 | 0.5 | 30.0 | 0.025 | 0.252 | 82.95 | 0.252 | 0.139 | −46 | −711 | 20 | −46 |
| 7 | 0.4 | 18.4 | −0.008 | 0.199 | 66.82 | 0.199 | 0.096 | −92 | 2142 | 18 | −71 |
| 8 | 0.3 | 9.1 | −0.020 | 0.132 | 47.23 | 0.132 | 0.056 | −175 | 677 | 13 | −106 |
| 9 | 0.2 | 3.2 | −0.016 | 0.064 | 26.13 | 0.064 | 0.024 | −332 | 499 | 0 | −166 |

*$\delta 1 = [(u/u_0 - \sigma_{max}/\sigma_{max0})/(u/u_0)]*100\%$
**$\delta 2 = [(\alpha 1/\alpha 1_0 - \sigma_{max}/\sigma_{max0})/(\alpha 1/\alpha 1_0)]*100\%$
***$\delta 3 = [(\alpha_{max}/\alpha_{max0} - \sigma_{max}/\sigma_{max0})/(\alpha_{max}/\alpha_{max0})]*100\%$
****$\delta 4 = [(\alpha_{av}/\alpha_{av0} - \sigma_{max}/\sigma_{max0})/(\alpha_{av}/\alpha_{av0})]*100\%$ A reference value determining the utilization of the load carrying capacity of the presented frame is the maximum value of the stress $\sigma_{max}$ (column f in Table 1) in the frame (in any place).

An analysis of the calculation results presented in Table 1 shows that the values of the deflection u in middle of the span (column c in Table 1) and the smaller of the two measured rotation angles, in this case α1 (column d in Table 1), behave completely differently as a function of the change in load distribution (cases 2-9 in Table 1) from the maximum stress $\sigma_{max}$ (column f in Table 1) occurring in the frame. The use of these values (u and α1) as a measure of the utilization of the load carrying capacity of the structural element for a non-uniform load could result in very large errors (column i in Table 1 for the deflection u and column j in Table 1 for the angle α1). The method for measuring the utilization of the load carrying capacity based on measuring any of the two possible rotation angles, thus also including α1, is used—without any reservations—to monitor the building structure according to the prior art, i.e. the specification of FI118701B.

Another method, disclosed in PL230522, is based on the measurement of the average value of the rotation angles $\alpha_{av}$ (column h in Table 1). The use of this value as the measure of the utilization of the load carrying capacity results in errors (column I in Table 1) reaching even −166% for a highly uneven load. An error value of less than zero additionally means that the current utilization of the load carrying capacity will be higher than the measured one (determined based on the measured values of the angle $\alpha_{av}$).

It is quite the opposite in the case of using the greater of the rotation angles $\alpha_{max}$ (column g in Table 1), in this case $\alpha_{max}=\alpha 2$, of two cross-sections as a value representing the utilization of the load carrying capacity of the frame. The ratio of the value of the greater of the rotation angles α1 and α2 of the cross-sections $\alpha_{max}$ (column g in Table 1) to the value of maximum stress $\sigma_{max}$ (column f in Table 1) is constant, with an error of no more than 20% for the presented frame (column k in Table 1), for changes in the unevenness of load within a wider range than what is observed in practice—from the uniformly distributed load across the entire length of the roof to one located only in ⅕ of the span. Such a value of the error is acceptable in the investigated application, especially since it is always higher than zero, which means that the current utilization of the load carrying capacity will be lower than the measured one (determined based on the measured value of the angle $\alpha_{max}$). Such a situation is safe; it poses no risk of overloading the structure by excessive utilization of its load carrying capacity.

In the case of using the deflection u, measured in the middle of the span of the frame (column c in Table 1), for determining the utilization of its load carrying capacity, the error of such determination (column h in Table 1) reaches a value of approx. −50% for a load located only on one roof surface (L1=0.5 L), or even on the order of −330% for a load located in ⅕ of the span. In addition, this error has a value lower than zero, which means that the current utilization of the load carrying capacity in this case would be higher than the measured one. Therefore, such a situation would be dangerous and it could pose a risk of overloading the structure.

The measurement of the utilization of the load carrying capacity of the building structural element (based on the measurements of the rotation angles α1 and α2) is possible when the building structural element is stable. The loss of stability means reaching the limit state of the utilization of the load carrying capacity regardless of the measured value of the utilization of the load carrying capacity. A loss of stability of the building structural element can be detected by means of optionally measured rotation angles γ1 and γ2, where a considerable change in one or both rotation angles can indeed mean a loss of stability.

Therefore, in structural systems of the single-bay frame type, the value of the greater of the rotation angles of cross-sections around the axis Z perpendicular to its cross-section, measured in two points of the structural system, situated symmetrically relative to the transverse axis of symmetry of the building structural element, caused by a variable action, represents the utilization of the load carrying capacity of the structure with sufficient accuracy for practice, within a scope of load changes which is real from a practical point of view. Similar error values are also obtained as a result of calculations for other types of structures, such as beams or trusses. In addition, the values of the rotation angles of cross-sections around axes perpendicular to these sections may serve the detection of a loss of stability of this system.

Figure 2:
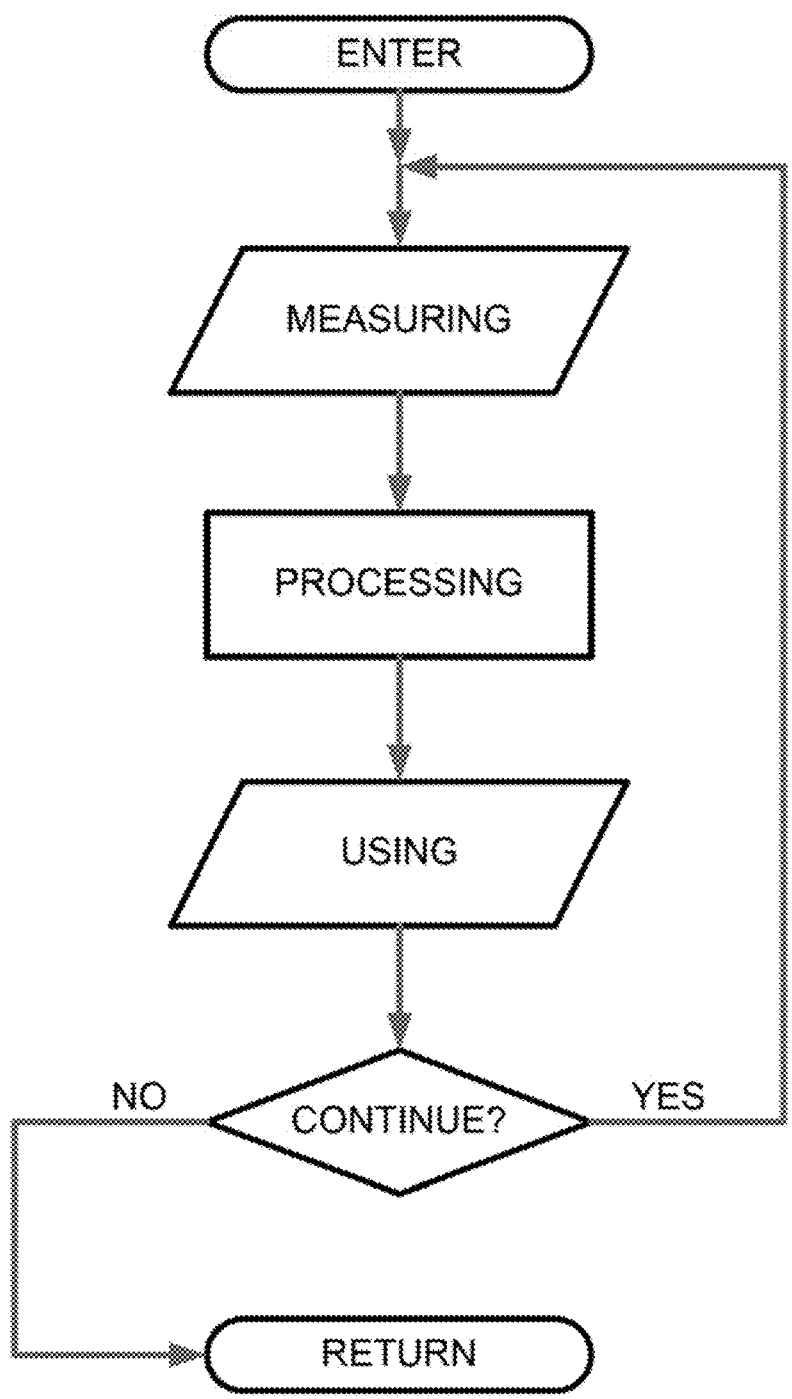
FIG. 2 is a simplified flow chart showing steps carried out according to an embodiment of the method as carried out for instance on the building of FIG. 1.

A flowchart is shown in FIG. 2 illustrating a method, carried out according to the foregoing description of the present invention, for measuring the utilization of the load carrying capacity of a structural element of a building subject to variable action. It includes a step of measuring of rotation angles of cross-sections of the structural element, wherein the rotation is caused by the aforementioned variable action, wherein the measuring of rotation angles includes measuring a rotation angle α1 and a rotation angle α2 of the cross-sections of the structural element around an axis (Z) perpendicular to a longitudinal section of the structural element at two points (A, B) of the structural element located symmetrically relative to a transverse axis of symmetry. To that end, tools such as inclinometers, light-based interrogators/sensors, or equivalent are employed to gather sensed signals having magnitudes indicative of the measured angles. A processing step may then be carried out on the signals gathered during the measuring step to obtain usable measurement data. This may be done by a signal processor. In a subsequent step of using the measurement data, a greater of a measured value of the angle α1 and a measured value of the angle α2 is used as a measure of the utilization of the load carrying capacity of the structural element. This may include a comparison to a set signal value, a decision step, outputting a signal used to indicate the current situation, or the like.

The measuring of the rotation angle γ1 and the rotation angle γ2 of the structural element cross-sections around axes perpendicular to the cross-sections comprises also measuring at the two points (A, B) of the structural element, and subsequently using the value of angle γ1 and the value of angle γ2 as an indicator of stability loss of the structural element of the building.

It should be realized that the measuring of rotation angles may performed periodically as shown by the decision step after the step of using, thereby allowing for repeated steps of measuring, processing, and using again. The steps may be performed synchronously as well.

The invention claimed is:

1. A method for measuring the utilization of the load carrying capacity of a structural element of a building subject to variable action, comprising attaching means comprising measuring devices for measuring rotation angles of rotations corresponding cross-sections of the structural element at respective points (A, B) on the structural element wherein the means for measuring rotation angles is for providing measured rotation angle signals having magnitudes indicative of the rotation angles of the rotations of the cross-sections at the respective points, wherein the rotations are caused by said variable action, wherein the measuring of rotation angles comprises measuring a rotation angle $\alpha 1$ and a rotation angle $\alpha 2$ of the cross-sections of the structural element around an axis (Z) perpendicular to a longitudinal section of the structural element at the respective points (A, B) on the structural element located symmetrically relative to a transverse axis of symmetry, processing the measured rotation angle signals by means of a signal processor using a greater of a measured signal magnitude of the rotation angle $\alpha 1$ and a measured signal magnitude of the rotation angle $\alpha 2$ as a measure of utilization of the load carrying capacity of the structural element while excluding the signal magnitude of the lesser measured rotation angle signal magnitude from the processing, and using the measured signal with the greater magnitude as a measure of the current utilization of the load carrying capacity of the structural element of the building with said signal magnitude of the lesser measured rotation angle excluded by said processing.

2. The method according to claim 1, wherein the means for measuring rotation angles include means for measuring of a rotation angle $\gamma 1$ and a rotation angle $\gamma 2$ of the structural element cross-sections around one or more axes perpendicular to the axis (Z) perpendicular to the longitudinal section also comprises measuring at the two points (A, B) of the structural element, wherein the means for measuring provides measured rotation angle signals having magnitudes indicative of the rotation angles of rotations around the one or more axes perpendicular to the axis (Z) perpendicular to the longitudinal section at the respective points, and subsequently using the magnitude of at least one of the measured signals of the rotation angle $\gamma 1$ and the rotation angle $\gamma 2$ as an indicator of stability loss of the structural element of the building.

3. The method according to claim 1, wherein the measuring of rotation angles is performed periodically.

4. The method according to claim 1, wherein the measuring of rotation angles is performed synchronously.

* * * * *